INVENTORS
JOHN H. INGMANSON
CARL A. LARSON
BY
Steward & Steward
THEIR ATTORNEYS

June 7, 1960   J. H. INGMANSON ET AL   2,939,904
COLORED RETRACTILE CORDS
Filed Jan. 18, 1956   3 Sheets-Sheet 2

INVENTORS
JOHN H. INGMANSON
CARL A. LARSON
BY
Steward & Steward
THEIR ATTORNEYS

June 7, 1960  J. H. INGMANSON ET AL  2,939,904
COLORED RETRACTILE CORDS
Filed Jan. 18, 1956
3 Sheets-Sheet 3
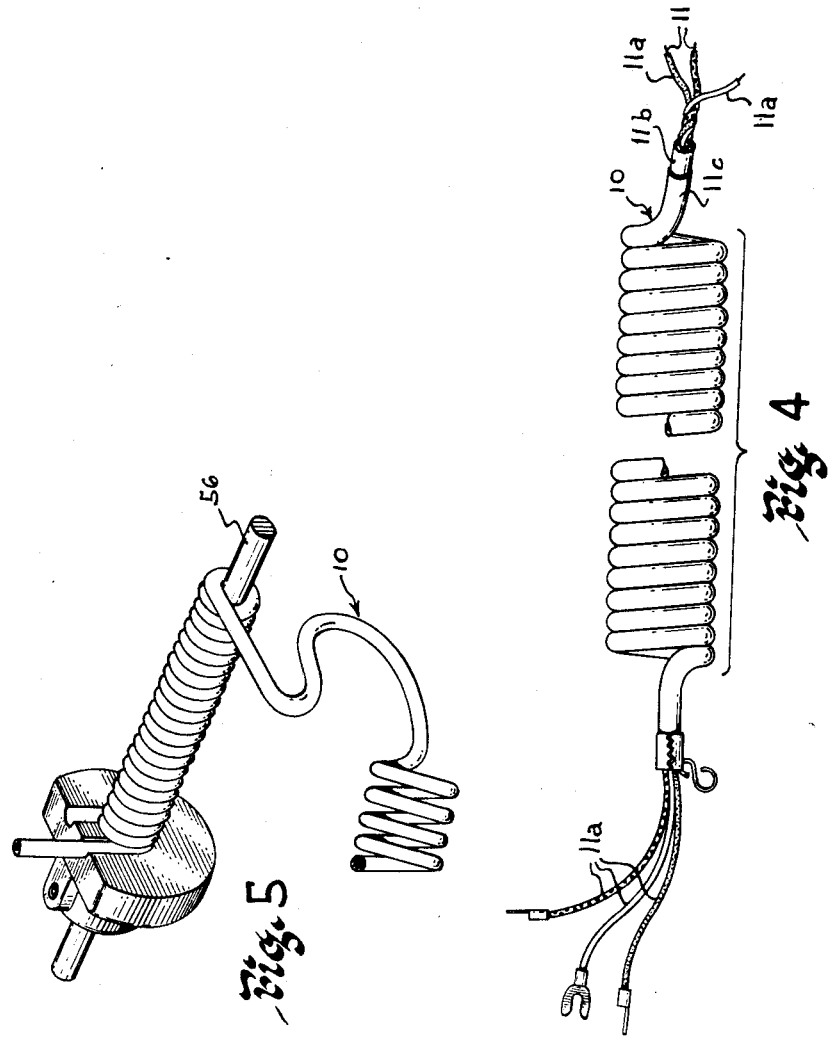
INVENTORS
JOHN H. INGMANSON
AND CARL A. LARSON
BY
Steward + Steward
THEIR ATTORNEYS

United States Patent Office

2,939,904
Patented June 7, 1960

2,939,904

COLORED RETRACTILE CORDS

John H. Ingmanson and Carl A. Larson, Hamden, Conn., assignors to The Whitney Blake Company, Hamden, Conn., a corporation of Connecticut Filed Jan. 18, 1956, Ser. No. 559,841

6 Claims. (Cl. 174—69)

This invention relates to improvements in elastic coil structures, and more particularly to retractile and extensible cords or cables useful for many purposes, primarily as electrical extension cords for appliances.

The invention relates still more particularly to cords of the foregoing type which may be made in a wide range of colors or hues so that they will match closely the color of the appliance with which they are used.

For a general understanding of the basic type of retractile cord to which the present invention is directed, reference is made to Patent No. 2,173,096 to J. W. Campbell. Retractile cords of the type there disclosed are designed to provide the necessary electrical connections to an appliance from an outlet plug or between separable parts of an appliance, one of which is adapted to be moved about independently, but within a limited distance or radius, of another part. A typical example of the foregoing is in the use of a retractile cord to connect the hand piece of a telephone set to the base portion thereof. Briefly, retractile cords of the type here concerned consist of a jacketed or insulated conductor coiled into a helical spring configuration from which it is yieldably extensible to a length at least several times its normal or retracted length. Such extension of the cord is permitted by the axial separation of the helices which takes place when the cord is pulled at its ends. The retractile force which causes the cord to return to its normal tight helical spring configuration is supplied by the outer jacket which is formed of elastomeric material, such as natural or synthetic rubber, more especially neoprene, or combinations thereof.

These retractile cords have proved enormously popular as a convenient, simple and effective way of providing a cord which will in effect store itself automatically and eliminate or substantially reduce the tangle of wire which commonly accompanies the use of straight-run types of extension cords.

Prior to this invention, these retractile extension cords have invariably been black, or at least dark gray, in color. Until now, this severe limitation in color has been an unavoidable practical one in telephone and especially in power cords, for example, where a substantial retractile force is required. In order to provide a jacket which will develop good retractile properties, including rapid and complete return to retracted position from an extended one, and which will maintain these properties over a long period of time, it has been necessary to include in the jacketing compound a substantial amount of carbon black as a reinforcing or fortifying agent. As will be pointed out in more detail presently, no really suitable substitute for carbon black has heretofore been known, as its reinforcing effect in the elastomers mentioned, both rubber and neoprene, is essentially unique. The presence of the carbon black, however, substantially masks out any other color which is added in an attempt to get away from the black or dark gray color imparted by the carbon black. So far as is known, all prior attempts to get away from this severe color limitation in the type of cord mentioned above, without adversely affecting its retractile properties, have met with little or no success commercially.

It is accordingly the principal object of this invention to provide colored retractile extension cords which will retain the superior retractile properties of the rubber or neoprene jacketed type containing carbon black, while permitting cords to be produced in a wide variety of colors, including white and very light pastel shades, to match extremely accurately both the color and finish of lacquered articles with which the cords are used.

It is a further object of this invention to provide such colored retractile cords in which the outer jacket serving as the retractile means will have a long life with respect to color fastness even under adverse conditions of high humidity and exposure to light. Further, it is an object to provide such cords which are free from cracking or crazing, and in which there is little or no tendency for discoloration to occur. A further important aspect of the novel cords is their freedom from staining of the finish of the appliance to which they are attached, or of furniture with which they may come in contact. It is of course an object also to provide a cord of this type which may be readily manufactured and is of economical construction.

As mentioned above, the use of retractile extension cords has become extremely widespread in the past ten or so years, particularly in communication apparatus such as telephone receivers, intercom sets, radio transmitters and dictating machines, for example. With the advent particularly of telephone receivers and similar communication equipment in a variety of colors for interior decorating purposes, it has become very desirable to be able to supply an extension cord which matches the color of the appliance. No great difficulty is encountered in producing straight-run, non-retractile cords in a matching color. The situation is vastly different, however, in the case of retractile cords of the self-retracting type.

For use in retractile cords, jackets of ordinary thermoplastics, which are much more easily colored to provide almost any desired shade, have proved quite inferior to neoprene to date. For example, plastics of the acrylic, polyvinyl chloride or similar types, having good dielectric properties and commonly used for insulating conductors, are notably lacking in any great degree of true elasticity. Attempt has been made to use such plastic insulated conductors for self-retracting helical cords of the type here concerned, but these attempts have thus far shown that permanent deformation and elongation of the helically coiled conductor invariably occurs after an extremely short period of use. Furthermore, the rate of retraction after elongation is rather poor, at best.

Nor have previous attempts to use elastomers, such as natural rubber or neoprene, without reinforcement by carbon black, proved successful in practice. But the presence of the carbon black interferes drastically with the coloring of such cords, for, unless an excessive amount of coloring pigment is incorporated, the effect of it is masked by the carbon black. The addition of such an excess is not only uneconomical but impractical because it greatly impairs the effectiveness of the resultant product as a jacketing material for self-retracting cords.

In accordance with one aspect of the present invention, a solution to this troublesome problem is provided by coating a conventional rubber or neoprene retractile cord containing carbon black with a closely adherent film or skin of an elastomeric composition incorporating the desired final color and having sufficient hiding power to mask the black cord.

In a somewhat different form of the invention, a neoprene-base jacketing compound, containing no carbon black, is similarly coated with a film or skin of an elastomeric-base material incorporating the necessary pigments to produce the desired color of cord. While in some respects this neoprene-base jacketing compound is not quite as efficient as the type fortified by carbon black, the particular composition hereinafter disclosed provides a jacket having excellent retractile properties which make it quite acceptable commercially. Moreover this new jacketing composition affords advantages over the black type in that fewer or less dense color coatings are required, especially in the lighter colors to provide a cord of superior color characteristics.

Color coating the base jacket of a retractile cord, whether the jacket is of the type incorporating carbon black or not, is not as simple as it might appear offhand. Good masking power in the outer skin or colored coating is of course of prime importance. Good adhesion or bond of the outer coating to the underlying jacket is likewise absolutely essential. At the same time, this coating must be such as not to affect adversely the retractile properties of the cord or reduce its serviceable life. In addition the coating must have the ability to withstand wear from mechanical usage, and of course be stable in color for an extended period of time. Like the base jacket itself, the coating must also be free of staining effect upon the appliance to which it is attached or upon a finished surface of furniture.

In accordance with the present invention, the novel composition which has been found to provide a color coating satisfying the foregoing requirements comprises basically a Banbury or mill-mixed chlorosulphonated polyethylene compound, supplemented by resins, plasticizers, inert fillers, activators, color pigments and curatives as will be more fully disclosed presently. The vulcanizable gums, including the polyethylene, comprise about 40% by weight of the coating composition on the dry basis. For application to the retractile cords, this composition is dissolved in a suitable organic solvent, such as toluene or xylene. The viscosity of this solution is particularly important and is dependent upon the percentage of solvent, which normally ranges from 70 to 90% of the solution.

The chlorosulphonated polyethylene compounds which has been found most suitable is a product which is sold commercially under the trade name "Hypalon" by E. I. du Pont de Nemours and Co., Inc., Wilmington, Delaware. This polymer is said to contain approximately 27.5% chlorine and 1.5% sulfur, the chlorine being substituted along the hydrocarbon chain at approximately every sixth or seventh carbon atom, while sulfur is attached to the chain as sulfonyl chloride groups occurring approximately every hundredth carbon atom. By proper selection of pigments for incorporation in the coating solution, coatings ranging from white or ivory to any of the darker or more brilliant shades may be produced. The retractile properties of cords coated with such compositions remains largely unaffected. In fact in certain respects such coating actually seems to improve the retractile property slightly, particularly with respect to ability to return to initial coiled condition after extended periods of extension under load. The coating does have some little effect on the load required for extension of the cord to a given length, increasing slightly the force necessary to produce a given elongation, but this is relatively minor.

In order that the method of preparing a colored retractile cord in accordance with the present invention may be more readily understood, a general outline of the steps involved in a typical procedure will be described. Initially conventional tinsel or stranded, flexible conductors which are to make up the central electrically conductive core of the retractile cord are individually insulated by extruding suitable neoprene or rubber insulation upon them. The number of such conductors will of course vary depending upon the service to which the final retractile cord is to be put, but normally these will range from two to four or five in number. These insulated conductors are then twisted together to form a core which is passed through an anti-tack compound, such as soapstone or talc, prior to enclosing this core in a base jacket. As has been mentioned, it is this base jacket which, in the final product, provides the self-retractile force necessary to retain the cord resiliently in, and to return it to, its helically coiled form. The compound from which this base jacket is made consists primarily of neoprene, and is prepared in a Banbury mixer in which it is milled with various plasticizers, fillers and fortifying agents. Finally, the curatives or accelerators are added and when sufficiently admixed, the compound is removed from the mill in the form of a ribbon and served to an extrusion machine which may also be coupled with a vulcanizer tube. The twisted core previously prepared is passed through the extrusion machine and the base jacket is applied. Depending on the type of tretractile cord being produced, the raw extruded jacket may or may not be given a semi-cure at once under steam in the vulcanizer tube. Where this is done, the rate of feed of the core is carefully controlled so as not to exceed a state of about one-half cure only of the base jacketing compound during this extrusion process.

While this pre-cure is generally desirable to facilitate the subsequent handling of the cordage and to reduce its tendancy to stick to itself or become deformed, it is not indispensable and is accordingly sometimes omitted, as will be explained more fully hereinafter. In either event, the jacketed cord is cooled and hardened by passing it through water, and is wound on large take-up reels or drums for subsequent processing to apply the color coating.

For purposes merely of illustration, there is shown in the accompanying drawings a simple form of apparatus which may be used to facilitate the handling of the cord during application of the color coating. As there shown, cord from the take-up reel has been cut into individual lengths and these individual lengths are suspended from a conveyor in the course of being color coated. Other systems adapted for handling the cord in different ways, as for example in continuous length, can of course be provided. In the drawings:

Fig. 4 is a perspective view of a completed retractile cord; and Fig. 5 is a view of a coil-forming mandrel and a cord which has been helically formed thereon.

Figure 1:
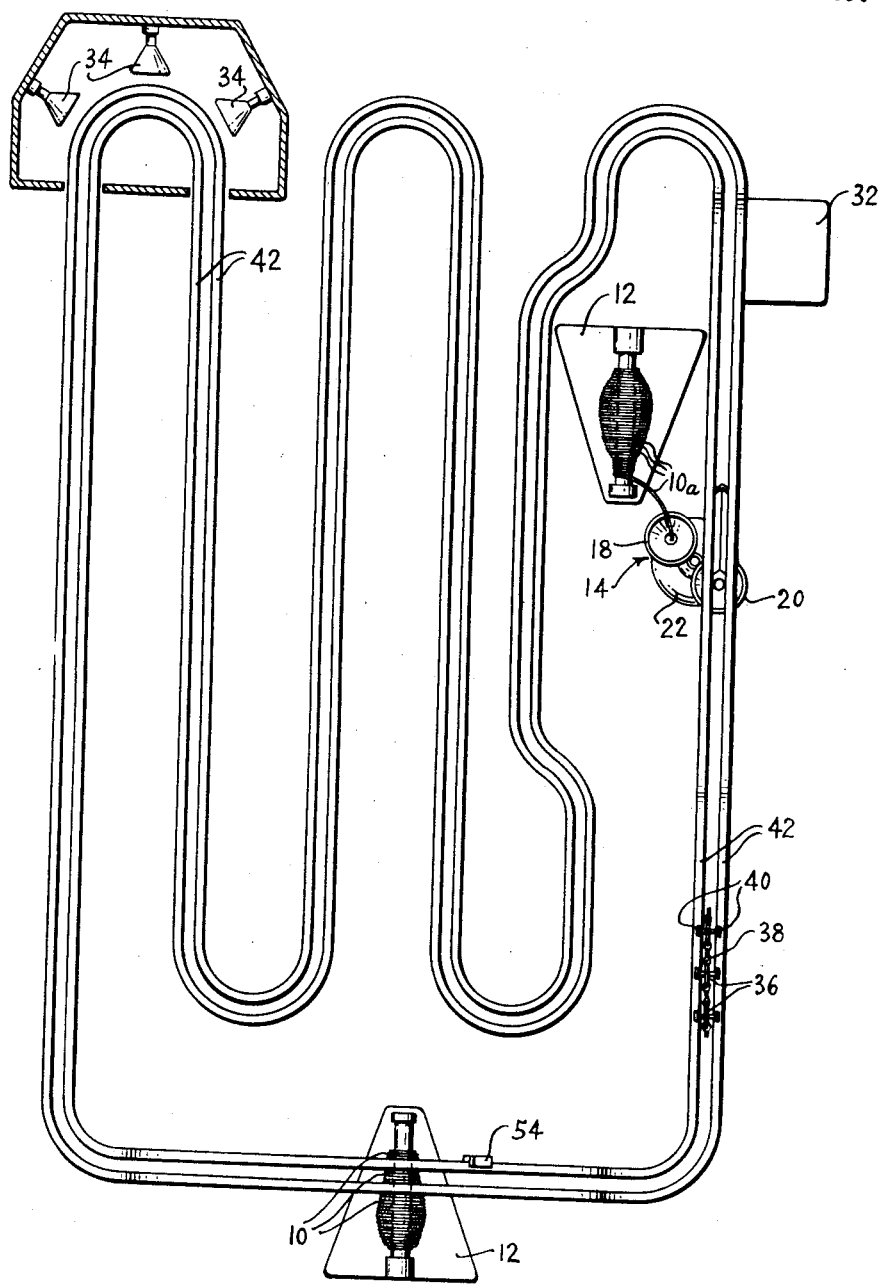
Fig. 1 is a plan view, looking from above, of a conveyor system for transporting the individual lengths of cord through several processing stations or zones where different operations are performed.
Figure 2:
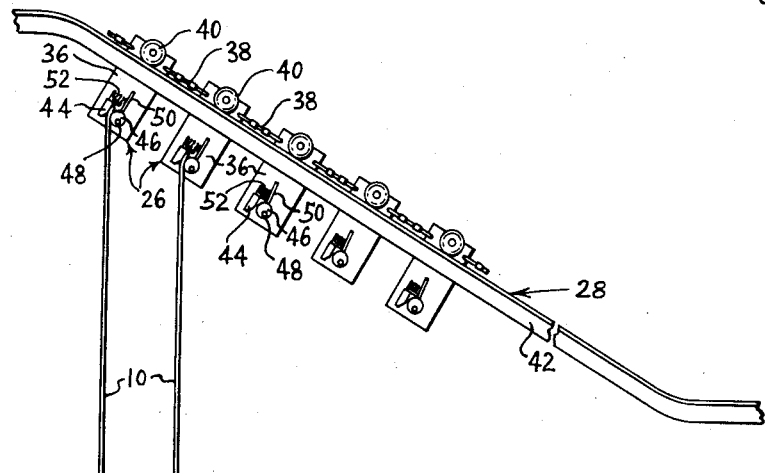
Fig. 2 is a fragmentary view in side elevation showing a portion of the conveyor at the color coating station.
Figure 2:
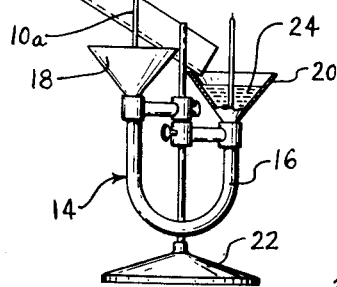

Referring to the drawings, cut lengths of cord 10a to be coated are grouped in bundles and hung for convenience over a rack 12 from which individual cords are withdrawn to pass them through a coating solution. These cords are made up of conductors 11 (three, in the example shown in Fig. 4), each of which has insulation 11a about it. These insulated conductors are twisted to form a core to which the base jacket 11b is applied. Preferably these cords 10a have been cleaned by passing them through toluol and then air wiped dry to provide a smooth surface on the base jacket 11b to accept the color coating. In Figs. 1 and 2 there is shown schematically a simple form of reservoir 14 for containing the coating solution. Since this solution contains a high percentage of volatile solvent, such as toluol, it is desirable to minimize as much as possible the volume of it exposed to the atmosphere at any time, especially since the viscosity of the solution is somewhat critical in attaining an optimum color coating on the cords. In the present instance, the reservoir means shown consists of a U-shaped conduit 16 having funnel shaped ends 18, 20. A suitable standard 22 supports the conduit so that it may be filled to an appropriate level with coating solution 24. One of the cords 10a is withdrawn from the bundle on rack 12 and fed endwise into funnel 18 until the forward end emerges from funnel 20. This end is then picked up and the rest of the cord drawn through the reservoir. A color coating 11c adheres to the base jacket and this coated cord 10 is then clipped at its end in one of a series of clamps 26 carried by an endless conveyor 28, whereby the cord depends freely downward to allow excess solution to run off. A drip pan 30 positioned below the suspended cords returns the excess solution to the reservoir. The reservoir is replenished from time to time as needed for automatically by suitable constant level means from an enclosed supply.

Conveyor 28 is driven continuously by conventional motor and sprocket means indicated generally at 32, and the coated cords 10 are allowed to dry as they are advanced along the conveyor run. For this purpose, the conveyor run may be made sufficiently long such that by the time a particular clamp 26 returns to starting position, the cord has fully dried. Heating units, such as the infra red lamps 34 shown in Fig. 1 may of course be supplied to hasten the rate of drying and shorten the length of conveyor run.

Figure 3:
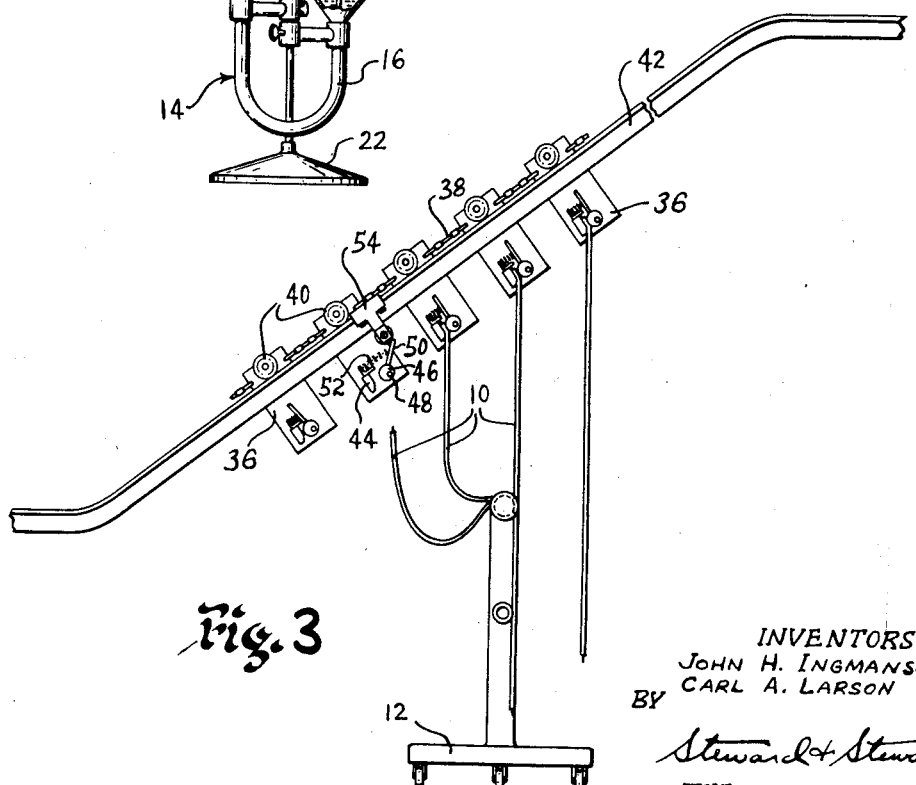
Fig. 3 is a fragmentary view in side elevation showing the conveyor arrangement at the final or unloading station.

As seen more particularly in Figs. 2 and 3, each conveyor clamp 26 consists of a plate 36 joined to adjacent plates by chain links 38. Plates 36 are provided with rollers 40 on either side which ride on rails 42 so that the plates hang down between the rails. The clamping means shown consists in each instance of a stationary block 44 secured to the plate 36 below the rails and a cooperating disc 46 pivoted adjacent the block. Disc 46 is pivoted eccentrically at 48 and is provided with a trip or release arm 50 projecting upwardly. A small spring 52 urges the disc to pivot toward block 44 to provide a bite therewith for holding the end of a cord.

When a cord is withdrawn from the coating solution, an operator opens the clamp 26 by pressing against the trip lever 50 in obvious manner, places the end of the cord in the bite and then releases the trip lever to engage the cord. At the end of the run, a trip 54 (Figs. 1 and 3) is engaged by the arms 50 as they pass, and clamps 26 open successively to releae the cords and allow them to drop free of the conveyor. A rack similar to rack 12 is provided at this point to catch the cords as they are released, as seen more particularly in Fig. 3.

Just prior to release of each cord 10 from the conveyor, or in conjunction with this, an anti-tack compound of soapstone or the like is applied. This may be done by dragging the cords through a tray of such material, or it may conveniently be applied by hand during the bundling of the cords in preparation for sending them to the coiling machines.

Obviously the foregoing method of applying the color coating, and the apparatus employed, may be modified substantially in practice. It will be apparent, for example, that equipment similar to conventional wire enameling towers may be employed to get continuous processing of cord without cutting it into individual lengths prior to color coating. Various other arrangements, either manual or automatic, can likewise be employed for putting the color coating solution on the cords. Good commercial results have been obtained, however, operating in the manner described.

After the cords are coated aand dried they are ready for forming into the final helical configuration (see Fig. 4) in which they are desired. In this operation, the cords are wound upon mandrels, such as mandrel 56 in Fig. 5. Such a mandrel is shown and described in greater detail in the patent to C. H. Judish 2,586,763. The cords on their respective mandrels are then supported in a rack and put into a pot vulcanizer. There the cords are given a final cure, usually under steam, after which they are removed and cooled to room temperature. Thereafter the cords are removed from their respective mandrels and given a reversed twist whereby the helical coil into which they have been set is in effect turned "inside out," as illustrated diagrammatically in Fig. 5 and more fully described in the patent to Collins 2,478,861. The cord is then ready for use.

The following specific examples of compositions, and operating conditions, for preparing suitable cord are given as illustrative of the best known manner of practicing the invention.

Considering first the preparation of a colored retractile cord in which the base jacket contains natural or synthetic rubber reinforced with carbon black, the base jacketing compound consists of the following ingredients in the approximate percentage range specified:

| | Percent |
|---|---|
| Neoprene GN | 45.3 |
| Finely divided carbon black | 32.6 |
| Inert filler (clay) | 6.4 |
| Paraffin wax | 1.5 |
| Light mineral oil | 6.9 |
| Magnesium oxide | 1.5 |
| Alkylated phenol sulfide | 1.0 |
| Zinc oxide | 2.9 |
| Stearic acid | 0.5 |
| 2-mercaptoimidazoline | 0.3 |
| GR–S | 1.0 |

In the foregoing analysis, the reinforcing pigments consist of carbon black, while the inert fillers are principally a finely ground clay. The plasticizer and softeners employed are a light mineral oil and paraffin waxes. The latter impart to the finished cord a waxy, smooth surface or film which assists materially in preventing cracking by increasing the ozone resistance of the jacket. The vulcanizing ingredients preferably consist largely of zinc oxide, with smaller amounts of such accelerators as mercaptoimidazoline sold commercially under the trade designation "NA-22." About 9 to 10 times as much zinc oxide as "NA-22" is preferred. For convenience, the zinc oxide and "NA-22" may be admixed by milling with a little synthetic rubber, such as GR–S, to facilitate subsequent dispersion of these curatives in the jacketing mix. Included also among the vulcanizing ingredients is a small amount of stearic acid, on the order of 0.5%, as an accelerator. The acid acceptor is preferably magnesium oxide, such as that sold under the trade name "Magnalite M." As an anti-oxidant, a non-amine type is used, such as "SantoWhite" which is an alkylated phenol sulfide. The neoprene employed is Neoprene GN.

The use of the more conventional amine type of antioxidants is particularly to be avoided, as these have been found to cause staining when used in jacketing compositions. Similarly staining is produced when the conventional accelerators, such as "Permalux" (di-ortho-tolylguanidine salt of dicatechol borate), are employed rather than the "NA-22" specified above. Staining may even be due to the neoprene base material itself, due to slight variations in the commercial product, although in general this does not give rise to much difficulty and can be avoided by proper selection of the raw material.

A mix of the foregoing base jacket composition is milled, ribboned and then served to an extruder for application to the twisted conductors comprising the core of the final cord, as previously outlined. The jacketing mix may be served to the extruder either hot or cold, followed by a partial or pre-cure as the cord emerges from the extruder. For the example given here, where the jacketing mix is served hot to the extruder, an extrusion rate of 250 feet per minute is employed for a three-conductor cord. This is followed by a pre-cure under 175 lb. steam pressure and the cord is then passed through water under 35 lb. pressure. Where the jacketing mix is served cold to the extruder, the extrusion rate is approximately 325 feet per minute, the steam pressure is the same as before but the water pressure is raised to around 75 lbs. This effects a state of approximately one-half cure of the resulting jacket which is desirable prior to applying the color coating in order to minimize sticking of the cord to itself and deformation of the jacket in subsequent handling.

The jacketed cord is then ready for the application of the color coating. Approximate percentages by weight of components in a specific formulation typical of the mix or base from which the coating solution is prepared are given below. To this color base of course is added the necessary solvent to produce the coating solution, as will presently be described.

| | Percent |
|---|---|
| Chlorosulfonated polyethylene ("Hypalon S-2") | 38.27 |
| Hydrogenated wood rosin | 0.95 |
| Titanium dioxide ("TiPure") | 5.03 |
| Finely divided clay | 38.27 |
| Calcium carbonate ("Atomite") | 9.58 |
| Paraffin wax and sunproofing ("Helizone") | 2.30 |
| Stearic acid | 0.38 |
| Magnesium oxide ("Magnalite M") | 2.39 |
| Vulcanizing agent ("NA-22") | .19 |
| Coloring pigments | 2.64 |

(Trade names of commonly available suitable commercial forms of a number of the components are noted in parenthesis.)

The color base is prepared on a rubber mill initially without the addition of any vulcanizing ingredients. The latter cause the mix to harden rapidly and are accordingly not added until later. In preparing this base, it is important to obtain a very homogeneous mass, as the coating is applied (from solution) in a very thin layer and consequently it is essential to have a high degree of dispersion to avoid flaws in the finished product. The preferred mixing schedule is to blend the "Hypalon," wood rosin and also the colorants on a mill first, and then add the dry fillers. After these are thoroughly dispersed, the softeners and plasticizers are added. As comparatively small amounts of the coloring solution are used at a time, it is preferable to prepare and store a batch of this color coating base and then re-mill small portions of it with the vulcanizing ingredients as required just prior to use.

As vulcanizing ingredients, the above noted magnesia and imidazoline have proved particularly satisfactory. Other vulcanizing agents, such as sulfur or one of the usual thiazole or thiurams, may also be used. The amounts of these present in the color coating base may be varied somewhat, of course, to obtain different degrees of tightness of the cure desired, however, the presence of too much will effect too rapid a cure, resulting in poor bonding of the color coating to the base jacket, and the final product will be particularly subject to crazing or cracking.

Coloring pigments may include in addition to titanium dioxide already mentioned, various red iron oxides, carbon black, phthalocyanine blue, yellow oxides or benzidene yellow, and combinations of these. These particular pigments give stable colors which are not affected in the course of final vulcanization or on extended exposure to light. The amount of these will vary with the color, ranging up to around 20% of the total composition, and proportionate readjustment of the amounts of the other ingredients is made accordingly.

The color coating base is dissolved in a solvent such as toluene to produce a coating solution having a viscosity of 17 to 30 seconds measured on a #2Z scale Zahn cup viscometer at room temperature. The viscosity will vary in practice with the color being used, but the foregoing range allows for additions to the base material of sufficient amounts of color pigments to obtain proper coverage of the cords. It will be obvious that the greater the viscosity, the greater will be the amount of coating retained on the cord, and hence the better the covering power. At the same time, an excessively viscous solution will produce coats which are too heavy and prone to blistering and wrinkling, and is to be avoided therefore.

Following coating of the cord in the color solution, a preliminary air drying period of about 12 minutes, without supplemental heating, is required before the cords can be handled and stacked on racks for further processing. This drying period, as previously discussed, is conveniently afforded by the travel of a coated cord through a conveyor run, and may be kept to a minimum by supplemental heating, as from infra red lamps, during part of the run. An excessively fast rate of drying must be avoided, however, to prevent blistering of the surface. Generally a bundle of the coated cords is then sent to a hot room for further curing at 110° F. to 130° F. for two hours in order to set the coating sufficiently to prevent sticking. Alternatively, the cords may be allowed to set at room temperature for approximately 48 hours. They are then ready to be wound onto mandrels and set in helically coiled form, as described hereinbefore.

The foregoing description has dealt with the color coating of cords in which the base jacket contains substantial amounts of carbon black and are consequently naturally black or at least quite dark grey in color to begin with. While these can be coated to produce a light colored cord in the foregoing manner, the problems are simplified where the jacket itself is of light color to begin with.

As mentioned hereinbefore, a light or natural colored compound suitable for retractile cord jacketing purposes has not been known heretofore, owing to the apparently inescapable necessity for the inclusion of substantial amounts of carbon black as a fortifying agent to provide the resiliency absolutely essential in cords of this type. A jacketing compound has now been discovered, however, which, without reinforcement by carbon black, will meet the critical requirements of retractile cords. The following specific analyses, giving approximate percentages by weight, is typical of the composition of such a jacketing compound:

| | Percent |
|---|---|
| Neoprene GN | 17.37 |
| Neoprene W | 17.37 |
| Chlorosulfonated polyethylene ("Hypalon S-2") | 10.01 |
| Microcrystalline paraffin wax ("Helizone") | 1.35 |
| Hydrogenated wood rosin | .20 |
| Light mineral oil ("Circo Light Oil") | 4.51 |
| Magnesium oxide ("Magnalite M") | 1.80 |
| Alkylated phenol sulfide ("SantoWhite Crystals") | 0.90 |
| Stearic acid | 0.50 |
| Titanium oxide ("Rayox") | 3.00 |
| Zinc oxide | 2.25 |
| 2-mercaptoimidazoline ("NA-22") | 0.20 |
| Clay | Balance |

Color pigments may sometimes be incorporated directly in this base jacket compound to make it easier to obtain a good, uniform coloring with a very thin color coating.

The neoprene and other components of the mix, except the accelerators and "Hypalon," are placed in a Banbury and mixed. The accelerators and "Hypalon" are then milled separately, and the previously prepared Banbury mix is slowly added to the accelerator-Hypalon mix during further milling. The composition is cut into ribbon and served hot to an extruder where it is applied to form an enclosing jacket around the twisted conductors making up the core of the cord. No precure is used for this base jacket composition as control of the cure is very difficult, if not impossible, resulting either in no cure at all, or complete cure or scorch so that the composition cannot be extruded. To overcome the natural tackiness in the uncured jacket, substantial amounts of neoprene W are substituted for part of the neoprene GN normally preferred in the carbon black base jacket composition. The gum or elastomer base is further modified in this instance by the inclusion of around 10% of "Hypalon," as indicated. These components, when combined with the fillers, plasticizers, and vulcanizer agents mentioned produce an excellent jacketing compound of substantially neutral (light beige) color without sacrificing good retractile properties.

The steps of color coating of cord jacketed with this composition are exactly the same as in the case of the black cord previously described, and the final curing or vulcanization of the cords to set them in their desired helical form is the same as before.

It has been found that where such light colored cords are exposed to direct sunlight for an extended period, staining of the light color coating may appear. This has been traced to bleed-through of components in the insulation employed on the separate conductors making up the core of the cord, and may be effectively controlled by spirally wrapping a thin paper barrier around the core prior to extruding the overall jacket around it.

Variations in the specific formulations, both in the base jacketing compound as well as in the color coating, are obviously possible within certain limits and a great many of these have been tried. Owing to the highly empirical nature of these elastomeric compositions, it is difficult to classify the various components or their percentage ranges which may be used. In general, however, the following summarization gives the range of percentages for the major components of the various compositions which are essentially critical in obtaining proper results:

|  | Approximate Percent Range by Weight | | |
| --- | --- | --- | --- |
|  | Base Jacket Compound | | Color Coating Base Compound |
|  | Black | Natural |  |
| Elastomers | 40-50 | 35-55 | 35-45 |
| Reinforcing pigments | 20-45 | -------- | -------- |
| Inert fillers | 0-20 | 35-50 | 30-60 |
| Plasticizers and softeners | 5-15 | 3-10 | 0.5-5.0 |
| Anti-oxidants | 0-2 | 0-2 | -------- |
| Vulcanizing ingredients: |  |  |  |
| (a) accelerators | 0.1-0.5 | 0.2-1.0 | 0.5-4.0 |
| (b) vulcanizing agents | 2.0-8.0 | 2.0-8.0 | 1-5 |
| Color pigments (non-black) | -------- | 0-10 | 0-20 |

What is claimed is:

1. In the manufacture of an extension cord of the self-retractile type, the steps which include forming a central cord of an insulated flexible stranded conductor, extruding thereon a vulcanizable neoprene base jacketing compound, coating said cords with a solution comprising a vulcanizable chlorosulfonated polyethylene, inert fillers, plasticizers, antioxidants, vulcanizing agents and coloring pigment and a volatile solvent to provide a viscosity of from around 17 to 30 seconds #2Z Zahn cup measurement at room temperature, hanging said cord vertically downward to allow excess coating solution to drain off, keeping said cord thus suspended until the retained coating material has set sufficiently to eliminate excessive tackiness, applying an anti-tack thereto, winding said cord on a mandrel to form a helical coil, vulcanizing said jacket and color coating under steam pressure to set said cord resiliently in helically coiled form, removing said cord from said mandrel and reversing the direction of helical progression of the coil by twisting said cord.

2. The method of making a colored retractile cord as defined in claim 1, wherein said neoprene base jacketing compound is partially vulcanized prior to coating said cord with said solution.

3. A colored retractile cord comprising an insulated conductor and an enclosing, coextensive base jacket of elastomeric material having the following approximate compositional analysis:

Percentage by weight
- Neoprene GN _____ 17.5
- Neoprene W _____ 17.5
- Chlorosulfonated polyethylene _____ 10.0
- Finely divided clay _____ 40.0
- Alkylated phenol sulfide _____ 1.0
- Light mineral oil _____ 4.5
- Paraffin wax _____ 1.5
- Titanium dioxide _____ 3.0
- Magnesium oxide _____ 2.0
- Zinc oxide _____ 2.3
- Stearic acid _____ 0.5
- Vulcanizing agent (2-mercaptoimidazoline) ____ 0.2 and a chlorosulfonated polyethylene-base color coating adhered on said jacket, which coating contains a coloring pigment, and wherein said chlorosulfonated polyethylene is a polymer containing approximately 27.5% chlorine and 1.5% sulphur, the chlorine being substituted along the hydrocarbon chain at approximately every sixth and seventh carbon atom, while sulphur is attached to the chain as sulfonyl chloride groups occurring approximately every hundredth carbon atom, said cord being helically coiled and said jacket having a set which holds the cord normally in helically compacted but resiliently extensible form.

4. A colored retractile cord comprising an insulated conductor and an enclosing elastomeric base jacket having the following approximate compositional analysis:

Percentage range by weight
- Neoprene GN _____ 40-50
- Reinforcing pigments _____ 20-45
- Inert fillers _____ 0-15
- Plasticizers and softeners _____ 5-15
- Antioxidant of non-amine type _____ 0-2
- Vulcanizing ingredients:
  - (a) Accelerators _____ 0.1-0.5
  - (b) Vulcanizing agents _____ 2-8 wherein the reinforcing pigments consist predominantly of carbon black which renders said base jacket substantially black in color, and a vulcanized chlorsulfonated polyethylene-base color coating adhered on said jacket containing a coloring pigment for hiding the coloring thereof, said color coating having the following approximate compositional analysis:

Percentage range by weight
- Chlorosulfonated polyethylene _____ 35-45
- Inert fillers _____ 30-60
- Plasticizers and softeners _____ 0.5-5.0
- Vulcanizing ingredients:
  - (a) Accelerators _____ 0.5-4.0
  - (b) Vulcanizing agents _____ 1-5
- Color pigments _____ Up to 20 and wherein said chlorosulfonated polyethylene is a polymer containing approximately 27.5% chlorine and 1.5% sulphur, the chlorine being substituted along the hydrocarbon chain at approximately every sixth and seventh carbon atom, while sulphur is attached to the chain as sulfonyl chloride groups occurring approximately every hundredth carbon atom, said cord being helically coiled and said jacket having a set which holds the cord normally in helically compacted but resiliently extensible form.

5. A colored retractile cord comprising an insulated conductor and an elastomeric base jacket enclosing said insulated conductor and having the following approximate compositional analysis:

Percentage by weight
- Neoprene GN _____ 45.3
- Finely divided carbon black _____ 32.6
- Inert filler (clay) _____ 6.4
- Paraffin wax _____ 1.5
- Light mineral oil _____ 6.9

| | Percentage by weight |
|---|---|
| Alkylated phenol sulfide | 1.0 |
| Magnesium oxide | 1.5 |
| Zinc oxide | 2.9 |
| 2-mercaptoimidazoline | .3 |
| GR–S | 1.1 |
| Stearic acid | .5 | wherein the carbon black renders said base jacket substantially black in color, and a vulcanized chlorosulfonated polyethylene-base color coating adhered on said jacket containing sufficient coloring pigment to hide the black color thereof, said color coating having the following approximate compositional analysis:

| | Percentage by weight |
|---|---|
| Chlorosulfonated polyethylene | 38.3 |
| Clay | 38.3 |
| Calcium carbonate | 9.6 |
| Titanium dioxide | 5.0 |
| Paraffin wax | 2.3 |
| Hydrogen wood rosin | 1.0 |
| Magnesium oxide | 2.4 |
| Stearic acid | .4 |
| 2-mercaptoimidazoline | .2 |
| Coloring pigment | 2.5 | and wherein said chlorosulfonated polyethylene is a polymer containing approximately 27.5% chlorine and 1.5% sulphur, the chlorine being substituted along the hydrocarbon chain at approximately every sixth and seventh carbon atom, while sulphur is attached to the chain as sulfonyl chloride groups occurring approximately every hundredth carbon atom, said cord being helically coiled and said jacket having a set which holds the cord normally in helically compacted but resiliently extensible form.

6. In the manufacture of a colored extension cord of the self-retractile type, the steps which include continuously forming a central cord of an insulated flexible stranded conductor, extruding thereon a vulcanizable neoprene base jacketing compound, coating said cord with a solution comprising a vulcanizable chlorosulfonated polyethylene, inert fillers, plasticizers, antioxidants, vulcanizing agents and coloring pigment in a volatile solvent to provide a viscosity of from around 17 to 30 seconds #2Z Zahn cup measurement at room temperature, passing said cord continuously through a drying zone in a substantially vertical direction to allow excess coating solution to drain off and until the retained coating material has set sufficiently to eliminate excessive tackiness, applying anti-tack thereto, cutting said cord into predetermined lengths and winding each such length on a mandrel to form a helical coil, vulcanizing said jacket and color coating under steam pressure to set each said length resiliently in helically coiled form, removing said helically formed cord from said mandrel and reversing the direction of helical progression of the coil by twistitng said cord.

References Cited in the file of this patent

UNITED STATES PATENTS

| 2,039,475 | Campbell | May 5, 1936 |
| 2,478,861 | Collins et al. | Aug. 9, 1949 |
| 2,488,527 | Dutcher | Nov. 22, 1949 |
| 2,586,763 | Judisch | Feb. 19, 1952 |
| 2,609,517 | Cox et al. | Sept. 2, 1952 |
| 2,618,574 | Pavlic | Nov. 18, 1952 |
| 2,704,782 | Ames | Mar. 22, 1955 |
| 2,707,693 | Dorst | May 3, 1955 |
| 2,751,318 | Speekman | June 19, 1956 |
| 2,752,317 | Sudekum | June 26, 1956 |

UNITED STATES PATENT OFFICE

CERTIFICATE OF CORRECTION

Patent No. 2,939,904                      June 7, 1960

John H. Ingmanson et al.

It is hereby certified that error appears in the printed specification of the above numbered patent requiring correction and that the said Letters Patent should read as corrected below.

Column 3, line 42, for "compounds" read -- compound --; column 3, line 70, after "Initially" insert a comma; column 4, line 20, for "tretractile" read -- retractile --; line 54, strike out "and"; column 5, line 18, for "for" read -- or --; line 48, for "releae" read -- release --; line 70, for "aand" read -- and --; column 7, line 18, for "S-2)" read -- S-2") --; column 12, line 22, for "twistitng" read -- twisting --.

Signed and sealed this 15th day of November 1960.

(SEAL)
Attest:
KARL H. AXLINE

Attesting Officer

ROBERT C. WATSON
Commissioner of Patents